United States Patent

Moritz, Sr. et al.

[11] Patent Number: 5,154,662
[45] Date of Patent: Oct. 13, 1992

[54] CRAB EXTRACTOR

[76] Inventors: Thomas A. Moritz, Sr., 528 Strawberry Ave., Vineland, N.J. 08360; Robert E. White, 318 Franklin Ave., Newfield, N.J. 08344

[21] Appl. No.: 748,525

[22] Filed: Aug. 22, 1991

[51] Int. Cl.$^5$ ............................................. A22C 29/00
[52] U.S. Cl. ......................................... 452/9; 100/121
[58] Field of Search ................... 452/9, 138; 100/145, 100/155 R, 910, 110, 117, 121

[56] References Cited

U.S. PATENT DOCUMENTS

| | | | |
|---|---|---|---|
| 1,335,133 | 3/1920 | Spjelkavik | 452/9 |
| 2,069,448 | 2/1937 | Ireland et al. | 100/121 |
| 3,688,344 | 9/1972 | Carlson | 452/9 |
| 3,829,931 | 8/1974 | Suerbaum | 452/9 |
| 4,083,084 | 4/1978 | Davis | 452/9 |
| 4,192,228 | 3/1980 | Antoniuk et al. | 100/121 |
| 4,300,264 | 11/1981 | Carlson | 452/9 |
| 4,513,478 | 4/1985 | Trahan | 452/9 |
| 4,523,349 | 6/1985 | Warren | 452/138 |
| 4,566,381 | 1/1986 | Nikulainen | 100/121 |
| 4,633,547 | 1/1987 | Caroon | 452/9 |

*Primary Examiner*—Willis Little
*Attorney, Agent, or Firm*—Fleit, Jacobson, Cohn, Price, Holman & Stern

[57] ABSTRACT

A crab extractor including opposed, large cylindrical rollers oriented in vertically superimposed relation with the lower roller being perforated. Cleaned, uncooked crabs which have been broken along a longitudinal center line from front to rear along the bottom are fed between the rollers with the feelers first by a belt conveyor. The rollers are driven which forces crab meat through the perforations or holes in the bottom roller which is scraped off by a doctor blade into an ager which conveys the extracted meat to a point of discharge. The shell components of the crab are not forced through the perforations and are scraped off of both rollers by doctor blades onto a conveyor. The rollers are interconnected by large meshing gears at one end thereof in order to rotate both rollers at the same speed in opposite directions. The lower roller is driven which in turn drives the upper roller and the auger which conveys the extracted meat from interiorally of the bottom roller is independently powered.

9 Claims, 2 Drawing Sheets

CRAB EXTRACTOR

BACKGROUND OF THE INVENTION

1. Field of the Invention

An apparatus for extracting crab meat from uncooked crabs thereby preserving the meat flavor and texture with the quality of the extracted crab meat being similar to "hand picked" crab meat. The crab extractor includes opposed, large cylindrical rollers oriented in vertically superimposed relation with the lower roller being perforated. Cleaned, uncooked crabs which have been broken along a longitudinal center line from front to rear along the bottom are fed between the rollers with the feelers first by a belt conveyor. The rollers are driven which forces crab meat through the perforations or holes in the bottom roller which is scraped off by a doctor blade into an auger which conveys the extracted meat to a point of discharge. The shell components of the crab are not forced through the perforations and are scraped off of both rollers by doctor blades onto a conveyor. The rollers are interconnected by large meshing gears at one end thereof in order to rotate both rollers at the same speed in opposite directions. The lower roller is driven which in turn drives the upper roller and the auger which conveys the extracted meat from interiorally of the bottom roller is independently powered.

2. Description of the Prior Art

Various efforts have been made to separate shellfish into separate meat and shell components which are conventionally separated by "hand picking" which is highly labor-intensive. Various machines and apparatuses have been developed to assist in the separation or extraction of meat from various shellfish. The following U.S. patents are relevant to this field of endeavor.

U.S. Pat. No. 1,335,133
U.S. Pat. No. 3,688,344
U.S. Pat. No. 3,829,931
U.S. Pat. No. 4,300,264
U.S. Pat. No. 4,513,478
U.S. Pat. No. 4,523,349
U.S. Pat. No. 4,633,547

None of the above patents disclose the specific structure of the crab extractor of the present invention including the manner in which the shellfish are prepared and conveyed to the machine and the structure for separating the meat by forcing it through a perforated roller and removing the meat from the interior surface of the perforated roller.

SUMMARY OF THE INVENTION

An object of the present invention is to provide a crab extractor which will effectively and efficiently extract crab meat from uncooked crabs in which the crabs have been broken along a longitudinal axis by moving the broken uncooked crabs between a pair of large cylindrical rollers with the lower of the two rollers being perforated and the upper of the two rollers being imperforate for squeezing or forcing meat through the perforations into the interior of the perforated drum with the shells being discharged from the opposite side of the rollers.

Another object of the invention is to provide a crab extractor in accordance with the preceding object in which the upper interior surface of the lower perforated roller is provided with a screw auger extending longitudinally therethrough and a doctor blade engaging the inner surface of the perforated roller to remove meat therefrom and discharge it into the screw auger for discharge at the longitudinal end thereof.

A further object of the invention is to provide a crab extractor in which the rollers are drivingly interconnected to rotate at the same speed in opposite directions with at least one of the rollers being driven and the screw auger is provided with an independent drive motor to facilitate removal of meat and discharge thereof.

Still another object of the invention is to provide a crab extractor in accordance with the preceding objects in which the surfaces which contact the crabs and meat are of stainless steel with the auger being constructed of plastic material to facilitate sanitation and cleaning.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 2:
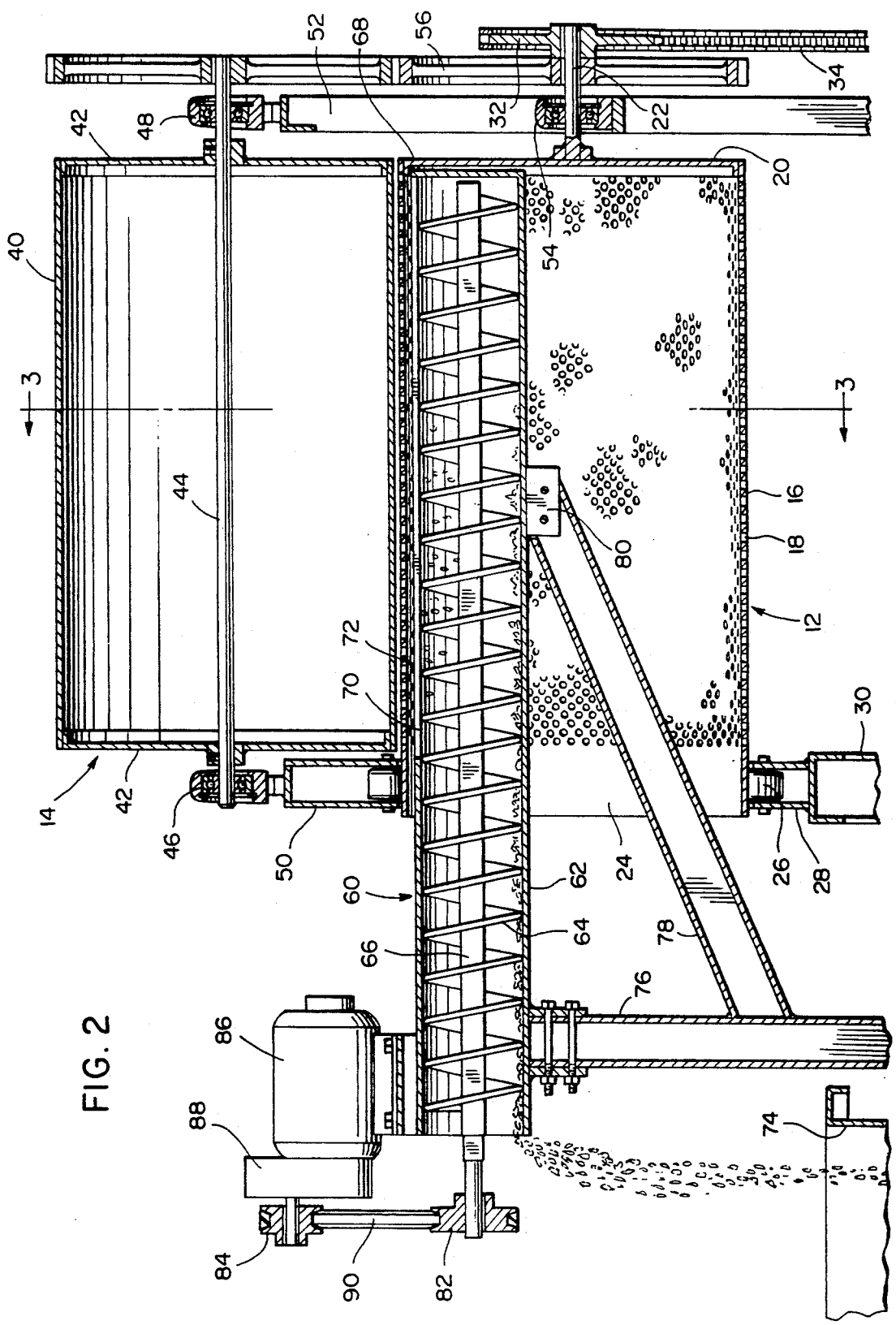
FIG. 2 is a longitudinal, sectional view of the crab extractor taken substantially upon a plane passing along section line 2—2 on FIG. 1 illustrating the structural details of the drums and auger.

Referring now specifically to the drawings, the crab extractor of the present invention is generally designated by the reference numeral lo and includes a pair of cylindrical rollers generally designated by reference numerals 12 and 14 which are disposed horizontally and in vertical alignment with the peripheries thereof oriented in closely spaced relation as illustrated in FIG. 2. The lower cylindrical roller 12 includes a cylindrical peripheral wall 16 having a plurality of holes or perforations 18 extending therethrough with the perforations being arranged continuously about the periphery and substantially the entire length of the roller or drum. One end of the roller 12 includes an end wall 20 having a short stub shaft 22 extending rigidly from the center thereof. The other end of the roller 12 is provided with an imperforate peripheral end portion 24 supported by a plurality of peripherally arranged supporting rollers 26 which are supported from a peripheral framework 28 supported by a frame structure 30 which extends to a supporting floor or the like. The stub shaft 24 is provided with a drive gear or sprocket 32 on the outer end thereof which engages a sprocket chain 34 connected with a sprocket gear 36 on a drive motor 38 such as an electric motor. Thus, the bottom roller 12 is supported for rotation about a longitudinal axis with one end of the roller being closed and the other end of the roller being open.

The upper roller 14 includes a cylindrical peripheral wall 40 which is imperforate and generally parallels the peripheral wall 16 of the roller 12 in slightly spaced relation thereto as illustrated in FIG. 2. The wall 40 is imperforate and includes imperforate end walls 42 and a central shaft 44 which extends therethrough and extends beyond the ends wall 42 with the end portions of the shaft 44 being journaled from bearings 46 and 48 with the bearing 46 being supported from a support structure 50 connected with the roller frame 28 and the bearing 48 being supported from a supporting framework 52 which also supports a bearing 54 for the stub shaft 22 as illustrated in FIG. 2.

The stub shaft 22 includes a large gear 56 thereon in meshing engagement with a large gear 58 attached to the outer end of the shaft 44 with the gears 56 and 58 being in meshing engagement to assure that the rollers 12 and 14 will be rotated at the same speed but in opposite rotational directions.

Positioned interiorally of the perforated roller 12 is a screw auger generally designated by reference numeral 60 which is eccentrically offset adjacent the upper interior surface of the roller 12. The screw auger 60 includes a generally cylindrical housing 62 receiving a spiral auger screw 64 therein which includes a central shaft 66 which may be square in configuration. The screw auger housing 62 extends from a point adjacent the end wall 20 outwardly beyond the open end of the roller 12. The inner end of the housing 12 is closed at 68 by an end wall and the portion of the housing 62 within the roller 12 includes an upper longitudinal opening 70 with one edge of the opening 70 being formed by an upwardly slanted doctor blade 72 which extends continuously from end-to-end of the perforated portion of the roller 12 in contact with the inner surface thereof with the doctor blade 72 being slanted in a manner that the doctor blade will be inclined in relation to the approaching interior surface of the roller 12 as it is rotated in the direction indicated by the arrow in FIG. 3. This structure scrapes any meat squeezed through the perforations 18 from the inner surface of the roller 1 into the interior surface of the housing 22 from which the auger screw 64 can convey the removed meat to the discharge end of the screw auger 60 into a suitable container as indicated by reference numeral 74 in FIG. 2. The outer end of the auger housing 62 which is imperforate outwardly of the roller 12 is supported by a supporting frame structure 76 and an inclined support 78 extends from the lower end of the supporting frame 26 upwardly in an inclined manner for connection with a bracket 80 attached to the bottom portion of the housing 62 to provide adequate support for the screw auger 60 throughout its length. The outer end of the screw auger shaft 66 is provided with a drive pulley 82 attached thereto in alignment with a drive pulley 84 on a drive motor such as an electric motor 86 having a reduction gear unit 88 thereon with the pulleys 82 and 84 being interconnected by a drive belt 90 for driving the auger screw 64 independently of the driving force imparted to the roller 12 and roller 14 through the gears 56 and 58.

Figure 3:
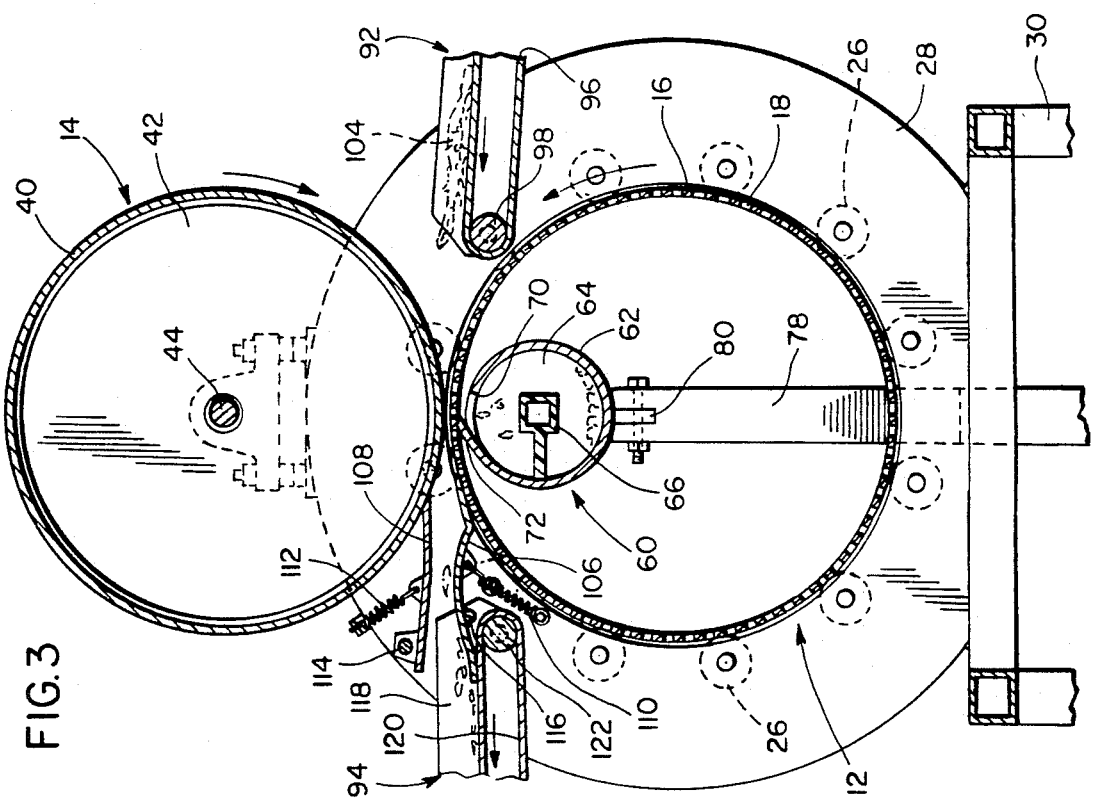
FIG. 3 is a transverse, sectional view taken substantially upon a plane passing along section line 3—3 on FIG. 2 illustrating further structural details of the crab extractor including the supplying conveyor, doctor blades and off-bearing conveyor.
Figure 1:
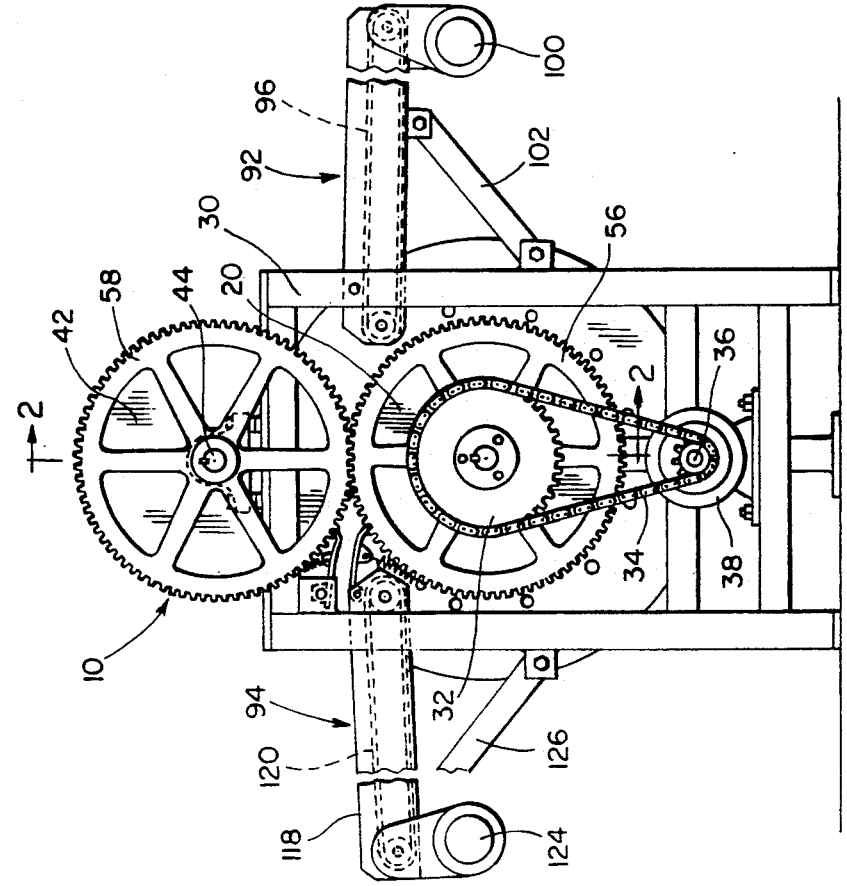
FIG. 1 is an end elevational view of the crab extractor of the present invention.

FIGS. 1 and 3 disclose a loading conveyor generally designated by numeral 92 and an off-bearing conveyor generally designated by numeral 94. The supply or feeding conveyor 92 includes a belt conveyor 96 entrained over end rollers 98 which can be driven by a suitable motor 100 and supported by suitable frame and bracing structure 102 with the discharge of the conveyor 92 being closely associated with the bite or nib between the rollers 12 and 14 where the surfaces of the rollers are moving toward each other. Uncooked crabs 104 which have been broken longitudinally along their back are positioned on the conveyor 92 with the feelers or claws forwardmost with the uncooked crabs being fed between the rollers 12 and 14 as illustrated in FIG. 3. As the crabs progress through the rollers, meat on the shell faces the perforated roller and is squeezed therethrough with the shell component of the crab remaining on the exterior surface of the rollers 12 and 14. The shells are removed from the surface of both of the rollers 12 and 14 by doctor blades 106 and 108 which are pivotally supported and spring biased toward the respective rollers by tension springs 110 and 112. The uppermost doctor blade 108 is supported by a bracket 114 attached to the frame structure and the lower doctor blade 106 is supported by a transverse support rod 116 on the frame structure 118 of the off bearing conveyor 94 which includes a belt 120 and end rollers 122 one of which is driven by an electric motor 124 supported by suitable framework and brace structure 126. The doctor blades 106 and 108 effectively scrape shells from the exterior surface of both of the rollers 12 and 14 and discharge the shells onto the conveyor belt 120 which discharges the shells to a suitable area for storage or for use for various purposes.

The drum size may vary to some extend is preferably 24" to 30" in diameter which provides a relatively low rotational speed and relatively slow peripheral speed to provide sufficient time for the crab meat to be extracted from the shell which has been broken and the portion of the shell facing the lower drum 12 has been removed to enable the desired crab meat to be squeezed through the perforations 18 in the peripheral wall 16. The perforations in the wall 16 may have a diameter of $\frac{1}{4}$" with center-to-center spacing of $\frac{3}{8}$". The rollers or drums are preferably stainless steel or they could be coated with a plastic material for sanitation purposes. Likewise, the screw auger structure may be constructed of stainless steel materials or plastic materials with the doctor blades being constructed of stainless steel material all of which renders the device easy to clean and sanitize and approve for use in association with food products.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A crab extractor for separating crab meat from cleaned, uncooked crabs which have been broken longitudinally, said extractor comprising a pair of large cylindrical rollers oriented in vertical superimposed alignment, means supporting the rollers for rotation about parallel horizontal axis, means drivingly connected to the rollers for driving them in opposite directions at substantially the same speed, the lower of the rollers being perforated to enable crab meat to be squeezed therethrough when crabs are fed between the rollers when the rollers are positioned in closely spaced relation, and means removing crab meat from the interior surface of the lower roller and conveying it to a crab meat container.

2. The crab extractor as defined in claim 1 wherein said means removing crab meat from the interior surface of the lower roller including a longitudinally extending screw auger positioned adjacent the upper area of the lower roller, said screw auger including a longitudinally extending cylindrical housing and an elongated auger screw therein, said housing having a longitudinal opening in the upper area thereof, and a doctor blade extending upwardly from the housing into contact with the interior surface of the lower roller to scrape meat from the interior surface of the lower roller, said doctor blade being positioned at one edge of the opening in the screw auger housing for discharging crab meat into the screw auger housing for movement longitudinally therein during rotation of the auger screw.

3. The crab extractor as defined in claim 2 wherein said lower roller includes a closed end and an open end with the screw auger extending from the closed end through the lower roller and outwardly from the open end for discharging into said crab meat container.

4. A crab extractor for separating crab meat from cleaned, uncooked crabs which have been broken longitudinally, said extractor comprising a pair of large cylindrical rollers oriented in vertical superimposed alignment, means supporting the rollers for rotation about parallel horizontal axis, means drivingly connected to the rollers for driving them in opposite directions at substantially the same speed, the lower of the rollers being perforated to enable crab meat to be squeezed therethrough when crabs are fed between the rollers when the rollers are positioned in closely spaced relation, and means removing crab meat from the interior surface of the lower roller and conveying it to a crab meat container, said means removing crab meat from the interior surface of the lower roller including a longitudinally extending screw auger positioned adjacent the upper area of the lower roller, said screw auger including a longitudinally extending cylindrical housing and an elongated auger screw therein, said housing having a longitudinal opening in the upper area thereof, and a doctor blade extending upwardly from the housing into contact with the interior surface of the lower roller to scrape meat from the interior surface of the lower roller, said doctor blade being positioned at one edge of the opening in the screw auger housing for discharging crab meat into the screw auger housing for movement longitudinally therein during rotation of the auger screw, said lower roller including a closed end and an open end with the screw auger extending from the closed end through the lower roller and outwardly from the open end for discharging into a crab meat container, said means supporting the rollers including a supporting framework, the upper roller including a central shaft extending beyond the ends thereof, bearing means rotatably supporting the bearings from the framework, the lower roller having a stub shaft extending from the closed end thereof, bearing means supporting the stub shaft from the framework, the open end of said lower roller including an imperforate end portion, a plurality of horizontal rotatable support rollers engaging the open end of the lower roller and means supporting the horizontal rollers from said framework.

5. The crab extractor as defined in claim 4 wherein said means driving the rollers includes a motor drivingly connected to a gear attached to the stub shaft on the lower roller, said upper roller including a gear on the shaft extending therethrough in meshing engagement with the gear on the lower roller to maintain the rotational speed of the rollers substantially the same and causing the rollers to rotate in opposite directions.

6. The crab extractor as defined in claim 5 together with a conveyor feeding crabs between the rollers and a conveyor for removing shells from the rollers, a pair of doctor blades engaging the external surface of each of the rollers to remove shells from the rollers and deposit them onto the shell conveyor.

7. The crab extractor as defined in claim 6 wherein said doctor blades engaging the exterior surfaces of the rollers being spring biased into scraping engagement with the exterior surfaces of the rollers and being associated with the rollers to remove shells therefrom and deposit the removed shells on the shell conveyor.

8. The method of extracting crab meat from cleaned, uncooked crabs having the shell broken along a longitudinal center line consisting of the steps of feeding crabs between a pair of rollers, one of which is hollow and perforated, with the feelers in advance of the crab shell, squeezing crab meat from the shell through the perforations in the perforated hollow roller, discharging the shells from the rollers and removing the crab meat squeezed through the perforations in the perforated roller thereby providing uncooked crab meat of a quality, taste and appearance similar to "hand picked" crab meat.

9. The method as defined in claim 8 wherein said step of removing the crab meat squeezed through the perforations includes the step of scraping the crab meat from the interior surface of the hollow roller throughout the length thereof, depositing the removed crab meat onto a conveyor extending longitudinally throughout the length of the hollow roller and outwardly from one end thereof for conveying the removed crab meat from the roller.

* * * * *